US006880217B2

(12) United States Patent
Garst

(10) Patent No.: US 6,880,217 B2
(45) Date of Patent: Apr. 19, 2005

(54) SEAL PULLER

(76) Inventor: Timothy D. Garst, 2220 Brentwood St., Lakewood, CO (US) 80214

(*) Notice: Subject to any disclaimer, the term of this patent is extended or adjusted under 35 U.S.C. 154(b) by 0 days.

(21) Appl. No.: 10/605,320

(22) Filed: Sep. 22, 2003

(65) Prior Publication Data

US 2004/0103511 A1 Jun. 3, 2004

Related U.S. Application Data

(60) Provisional application No. 60/319,566, filed on Sep. 22, 2002.

(51) Int. Cl.[7] ................................................ B23P 19/02
(52) U.S. Cl. ........................................... 29/235; 29/275
(58) Field of Search .......................... 29/235, 247, 255, 29/275, 248; 81/463, 466; 173/90

(56) References Cited

U.S. PATENT DOCUMENTS

| | | | | |
|---|---|---|---|---|
| 4,211,446 A | * | 7/1980 | Shultz, Sr. | 294/26 |
| 4,476,861 A | * | 10/1984 | Dimakos et al. | 606/100 |
| 5,058,255 A | * | 10/1991 | Qualkenbush | 29/255 |
| 5,109,739 A | * | 5/1992 | Hull et al. | 81/463 |
| 5,245,737 A | * | 9/1993 | Perea | 29/247 |
| 6,397,447 B1 | | 6/2002 | Christopherson et al. | 29/235 |

* cited by examiner

*Primary Examiner*—Lee D. Wilson
(74) *Attorney, Agent, or Firm*—Kyle W. Rost

(57) ABSTRACT

A seal puller tool head (10) has a blade forming an elongated, flat, metal shank (12) and a hook (16) that is disposed at one end of the shank, above a top face of the shank, such that it lies no more than partially in the plane of the shank. The hook is angled or offset above the shank for use in penetrating the interface between a sealed shaft and a shaft seal without scratching the shaft or requiring extreme lateral tilting of the shank to establish a hooked engagement on the inside face of the seal. The shank (12) is coated with cushioning or protective material to further avoid scratching the shaft, and a backside edge opposite the opening of the hook may carry a wear strip (42) as further protection. A base (14) is suitably configured to be engaged by a wrench, slide hammer, or lever for manipulating the hook in tight clearances. A fulcrum also engages the lever in variable position.

20 Claims, 9 Drawing Sheets

SEAL PULLER

CROSS REFERENCE TO RELATED APPLICATIONS

This application claims the benefit of U.S. Provisional Patent Application Ser. No. 60/319,566, filed Sep. 22, 2002, pending.

BACKGROUND OF INVENTION

1. Field of the Invention

The invention generally relates to metalworking and to a puller or pusher having a lever operator. More specifically, the invention relates to means to assemble or disassemble. The invention discloses a means to apply or remove a resilient article, such as a tube, sleeve, or shaft oil seal.

2. Description of Related Art

Including Information Disclosed Under 37 CFR 1.97 and 1.98—Shaft seals are widely used in engines and other devices to prevent oil or other liquids from escaping at the location where a shaft passes through a wall. A common mounting for a shaft seal is in a wall of an engine, in a circular recess encompassing a shaft passageway. Some recesses have a stop wall to prevent a seal from being pushed entirely through the wall during installation. Other recesses have no stop wall, and a seal can be pushed too far into the engine.

Shaft seals typically are constructed with an annular metal cage and a neoprene lip carried inside the cage and extending toward the center of the annulus. The lip contacts the motor shaft extending through the shaft passageway. The lip permits the shaft to rotate while preventing oil from escaping. The neoprene lip is subject to wear and the seal needs periodic replacement. Mechanics employ various seal pullers and seal removing techniques. Often a seal puller is a hooked rod that can be pushed between the lip of a seal and the shaft it rides against. The rod is hooked behind the metal cage and pulled to free the seal. Another technique employs a punch or drill to form a small hole in the seal cage. A screw is screwed into the hole, and the screw is pulled, such as with a pliers, to free the seal. Still another technique employs a screwdriver or other pry rod, inserted at an angle between the seal and shaft, to pry the seal free.

A continuing problem with any known removal tool or technique is that the motor shaft may become scratched at the contact point for the seal lip. Any scratch will cause the new seal to fail rapidly, resulting in an oil leak. Another problem is that the recess in the engine wall may be damaged, which also produces an oil leak. Still another problem is that the seal may be pushed back into the recess by the tool or technique intended for removal. If the seal strikes a stop wall, removal from the recess can be difficult. However, if a seal is pushed entirely through the engine wall, it becomes almost impossible to remove without vastly expanded disassembly of the engine.

A further problem has worsened with use of transverse-mounted engines. Many oil seals are used on crankshafts and camshafts, which also are transverse in the engine compartment of a vehicle having a transverse mounted engine. Very little room is available at the sides of an engine compartment. Often this prevents the use of conventional seal pullers, because there is no adequate room to insert or manipulate the tool.

It would be desirable to have a seal puller tool that can operate with reliability in the tight area between a seal and its shaft. Further, it would be desirable to have a seal puller tool that can be inserted through the interface between a seal and its shaft with minimal danger of scratching the shaft. In addition, it would be desirable to have a seal puller tool that can operate in a tight clearance, such as in the space between a transverse-mounted engine and a side of the engine compartment.

To achieve the foregoing and other objects and in accordance with the purpose of the present invention, as embodied and broadly described herein, the method and apparatus of this invention may comprise the following.

SUMMARY OF INVENTION

Against the described background, it is therefore an object of the invention to provide a seal puller tool that can operate with reliability in the tight area between a seal and its shaft.

Another object is to provide a seal puller tool that can be inserted through the interface between a seal and its shaft with minimal danger of scratching the shaft.

Still another object is to provide a seal puller tool that can operate in a tight clearance, such as in the space between a transverse-mounted engine and a side of the engine compartment.

According to the invention, a seal puller tool is adapted for entering an interface between a shaft seal and a sealed shaft to pull the seal. The tool includes a generally planar shank having opposite proximal and distal ends, a bottom face and a top face, and opposite side edges including a hook-facing side edge and a backside edge. A seal-engaging hook is located on the distal end of the shank, disposed with a free end at least partially offset above the top face of the shank, such that, in use, the free end is positionable behind the shaft seal while the shank is disposed with its bottom face against the shaft. An attachment base is connected to the proximal end of the shank.

According to another aspect of the invention, a seal puller tool is adapted for entering an interface between a shaft seal and a sealed shaft to pull the seal. The tool includes a longitudinally elongated planar sheet metal blade having a notch formed in one of its edges. The notch defines a seal-engaging arm located at a first longitudinal end of the blade and disposed transversely to the longitudinal dimension of the blade. An attachment base is connected to the second longitudinal end of the blade and defines at least one connection adapted to receive and engage a lever. A lever is engageable with the connection for manipulating the seal-engaging arm.

The accompanying drawings, which are incorporated in and form a part of the specification illustrate preferred embodiments of the present invention, and together with the description, serve to explain the principles of the invention. In the drawing:

DETAILED DESCRIPTION

Figure 1:
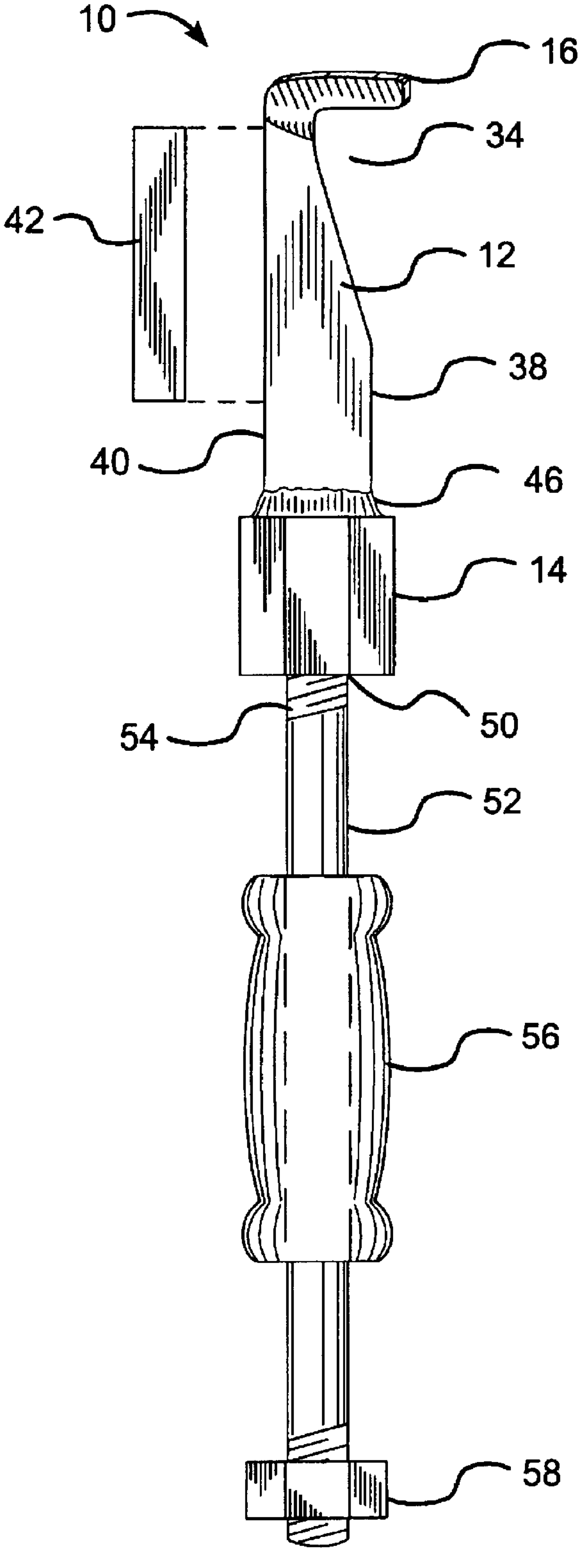
FIG. 1 is a side view of a seal puller tool head in combination with a slide hammer attachment, also showing an optional wear strip in exploded position.

The invention is a seal puller tool employing a generally flat blade that forms both a shank of the tool and a hooked end that can be inserted behind a seal to pull it from a seal recess. The flat blade and hooked end can be inserted through the interface between a seal and its shaft to bring the hooked end behind the seal. A flat or generally planar face of the blade makes contact with the circumferential surface of the shaft. The flat face of the blade is characterized by an absence of sharp or potentially damaging structures that are likely to contact the shaft. Thus, sliding a flat blade face over the shaft is relatively safe.

A flat, generally planar construction for the blade is desirable. The blade may be constructed of metal sheet stock. The blade should be longitudinally elongated, with a length greater than width, and a thickness less than the width. The opposite ends of the elongated blade will be referred to as distal and proximal ends. The front or distal end carries the hooked end and is the end inserted through the seal/shaft interface.

The interface between a shaft seal and its shaft is curved. The circumferential wall of the shaft defines the degree of curvature, since the shaft seal is in sealing contact with this wall. A flat or planar blade can be inserted at the interface, despite not being an exact match for the curvature. While the shaft itself is likely to be formed of a relatively hard and unyielding material such as steel, the seal lip is formed of a relatively softer, flexible, and resilient material such a neoprene rubber or another material in the broad classes of rubber, plastic, elastomer, or even leather or other animal hides. The yieldable nature of the seal lip allows a flat or planar blade to enter the seal/shaft interface despite not perfectly matching the curve of the interface. Further, the resilient nature of the seal lip can help to hold the flat blade in a centered or symmetric position with respect to the curve of the shaft, so that neither side edge of the blade will tend to contact the shaft. Instead, the flat blade will tend to slightly and evenly deform the seal lip away from the shaft while contacting the shaft along a centerline of midpoint between the blade side edges. Consequently, a flat blade can be safely inserted through the interface and, due to the self-aligning characteristic described above, does not require that the mechanic employ unusual care.

The seal-engaging hook on the inserted end or front end of the blade is formed as a unitary part of the blade. A unitary structure is desirable so that the hook and shank are connected in a way that produces no structures likely to scratch the shaft. Thus, one way of forming the hook is to form a notch or recess in a side edge of the blade, such that the blade has a greater width at least in front of the notch. In use, the blade can be inserted through the interface to bring the notch into registration with the seal lip. Due to the resilience of the seal lip, a part of the lip will enter the notch. The front portion of the blade already inserted beyond the seal lip can be regarded as the hook or other engaging structure for pulling the seal. The contour of the notch can be sufficiently sharp, hooked, or otherwise shaped to engage the seal upon the reverse movement of the blade. Thus, in some situations a flat blade with a notch near the tip might be effective to pull a seal without scratching the shaft.

A modified structure of the shank and hook can enable better and more reliable performance, with continued and improved resistance to scratching the shaft. For purposes of description, one face of the blade is regarded as a bottom face that will be engaged against the shaft, and the opposite face is regarded as the top face that will be engaged against the seal lip. The modification is a bend in the blade structure, such that at least a portion of the end of the hook is removed from the plane of the shank and raised above the top face of the shank. Suitable bends include an offset, a tilt, a twist, or any combination of these.

This modification produces two results. First, at least part of the edge forming the notch is raised above the bottom face of the shank, further reducing the chance of scratching the shaft. Second, when the seal lip is engaged in the notch, the raised part of the hook obtains greater engagement with the seal to more reliably pull the seal. In most situations, pulling a seal requires that the pulling tool engage the peripheral metal cage that carries the softer seal lip. It may be necessary with either the co-planar blade or the modified blade to laterally twist the blade in order to engage the cage. The modified blade will require less lateral twisting to achieve this engagement. When the blade is twisted laterally, a side edge of the blade may be brought into contact with the shaft, creating a danger of scratching. The use of an offset hook reduces the necessary degree of twist and correspondingly reduces the danger of scratching the shaft.

An equivalent configuration can employ a blade shank that is gently curved or twisted to better match the curvature a shaft surface. The blade then is well suited to enter the interface with the concave side of the curve toward the shaft. Metal sheet stock often has an inherent curve due to the practice of storing such sheet stock in coils as it is formed. The curvature of the blade may include the coil curvature or other formed curvatures. Terms such as “generally flat” or “generally planar” also refer to a blade or tool shank configuration that is gently curved or twisted.

Figure 2:
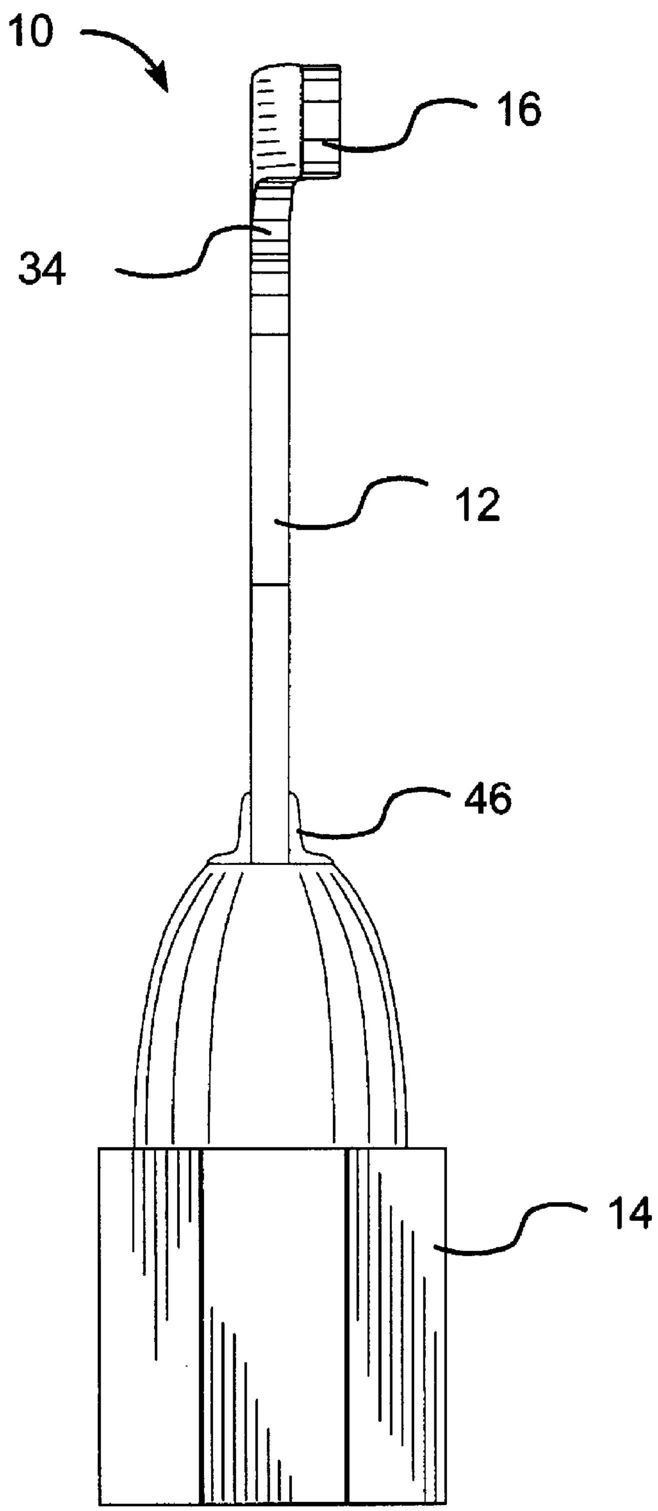
FIG. 2 is a front view of a seal puller tool head, showing a first embodiment of the seal hook.
Figure 3:
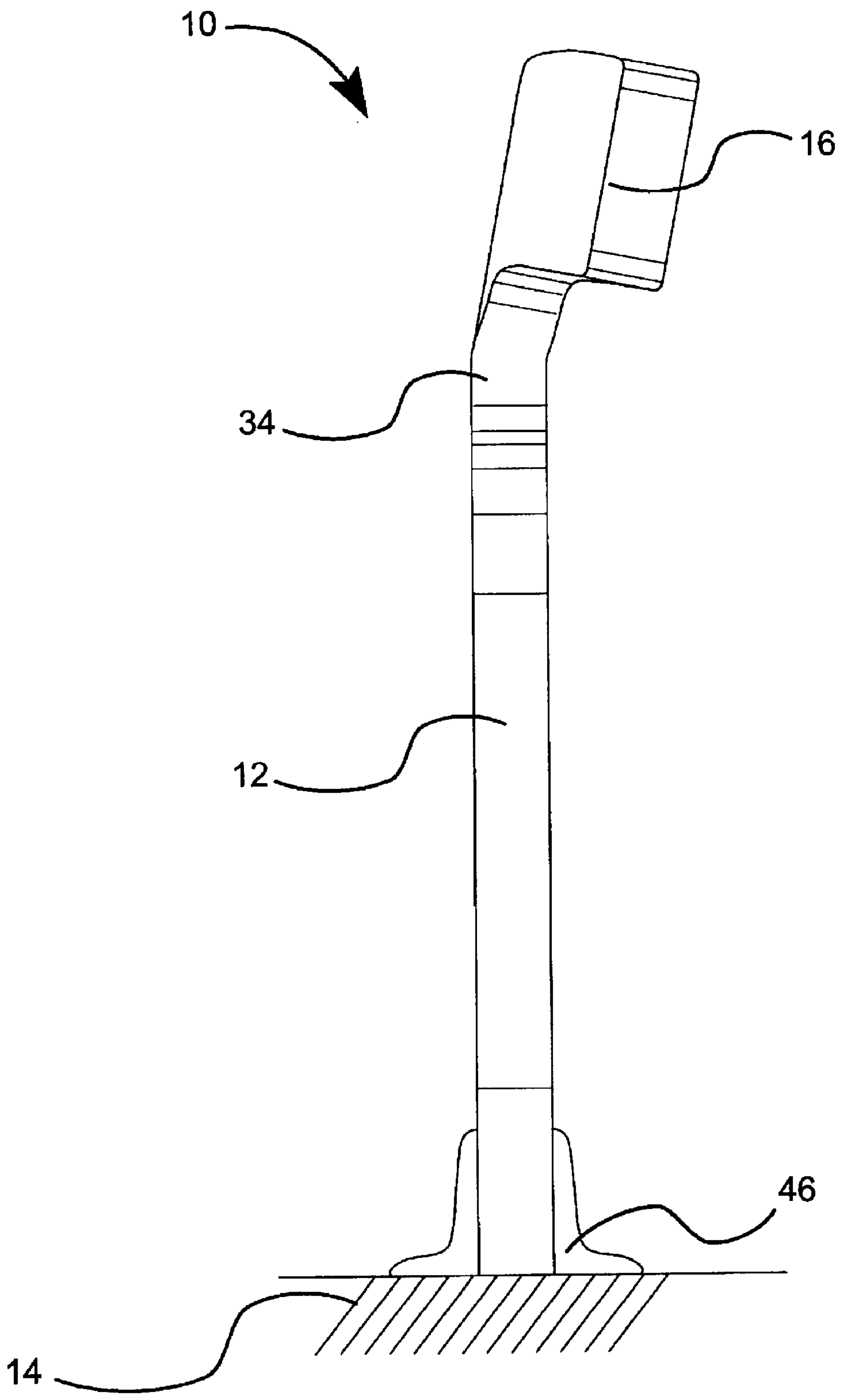
FIG. 3 is a detailed view of a seal puller tool blade, showing a second embodiment of the seal hook.

With reference to FIGS. 1–3, a seal puller tool head 10 is formed of a thin, generally flat, metal blade that defines a shank 12 of the tool head. One end of blade is joined to a base 14. The opposite end of the blade is joined to a seal-engaging arm, which will be referred to as a hook 16. The blade may be formed of a strong, resilient metal such as a sheet of spring steel. The tool head has an axis of preselected length or longitudinal dimension, in which a proximal end is at the base 14 and the distal end is at hook 16.

The tool head 10 may be carried on a slide hammer or lever 18 in either a longitudinal position or a transverse position. The orientation of FIG. 1 illustrates a longitudinal position, with the elongated dimension of a slide hammer or lever 18 aligned with the longitudinal dimension of the tool head. The orientations of FIGS. 4, 6, 8, and 9 illustrate transverse positions, in which the longitudinal dimension of the tool head 10 is transverse to the elongated dimension of a lever 18 or slide hammer.

Figure 4:
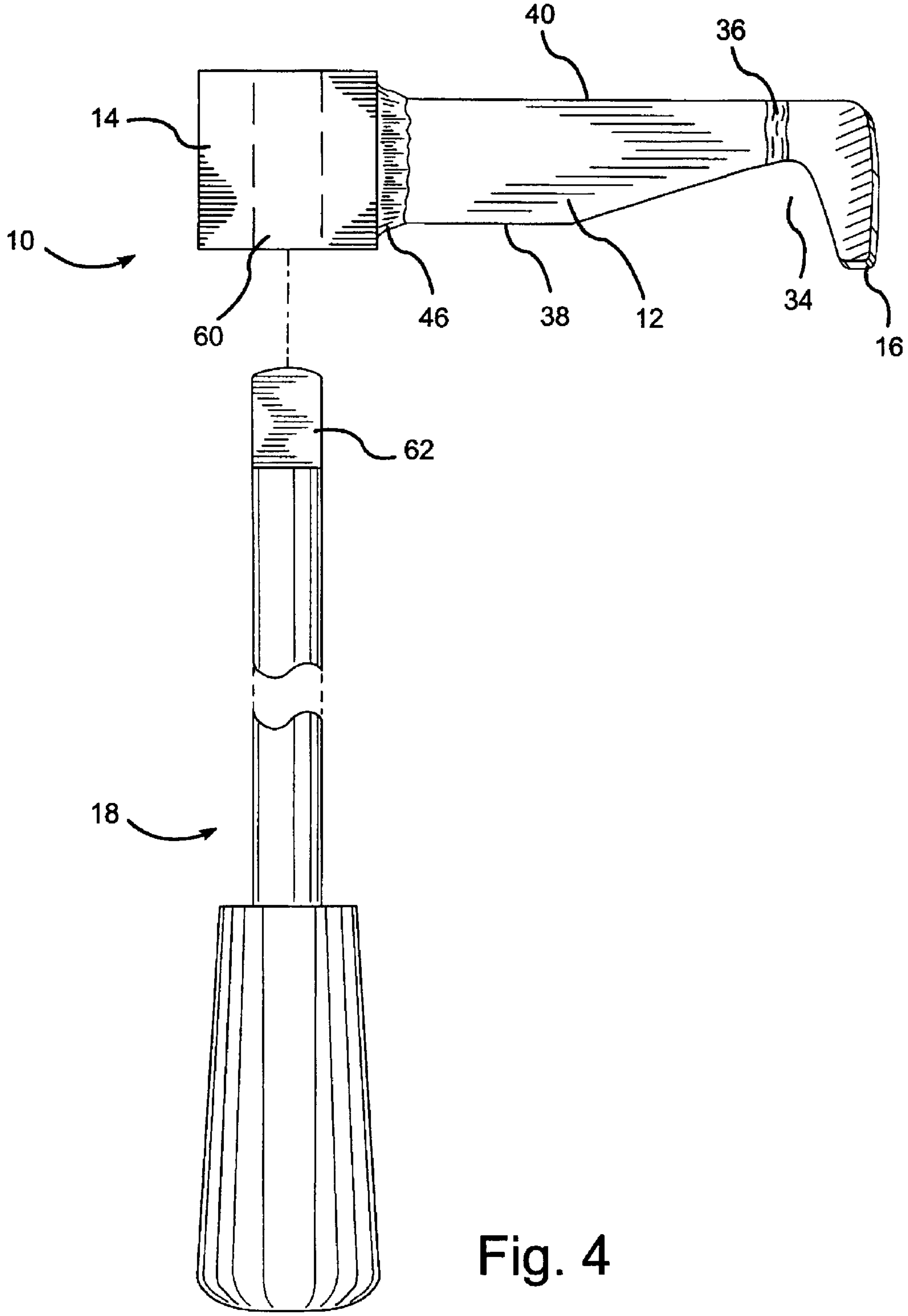
FIG. 4 is an exploded side view of a seal puller tool head in combination with a transverse lever attachment having a square rod end.
Figure 8:
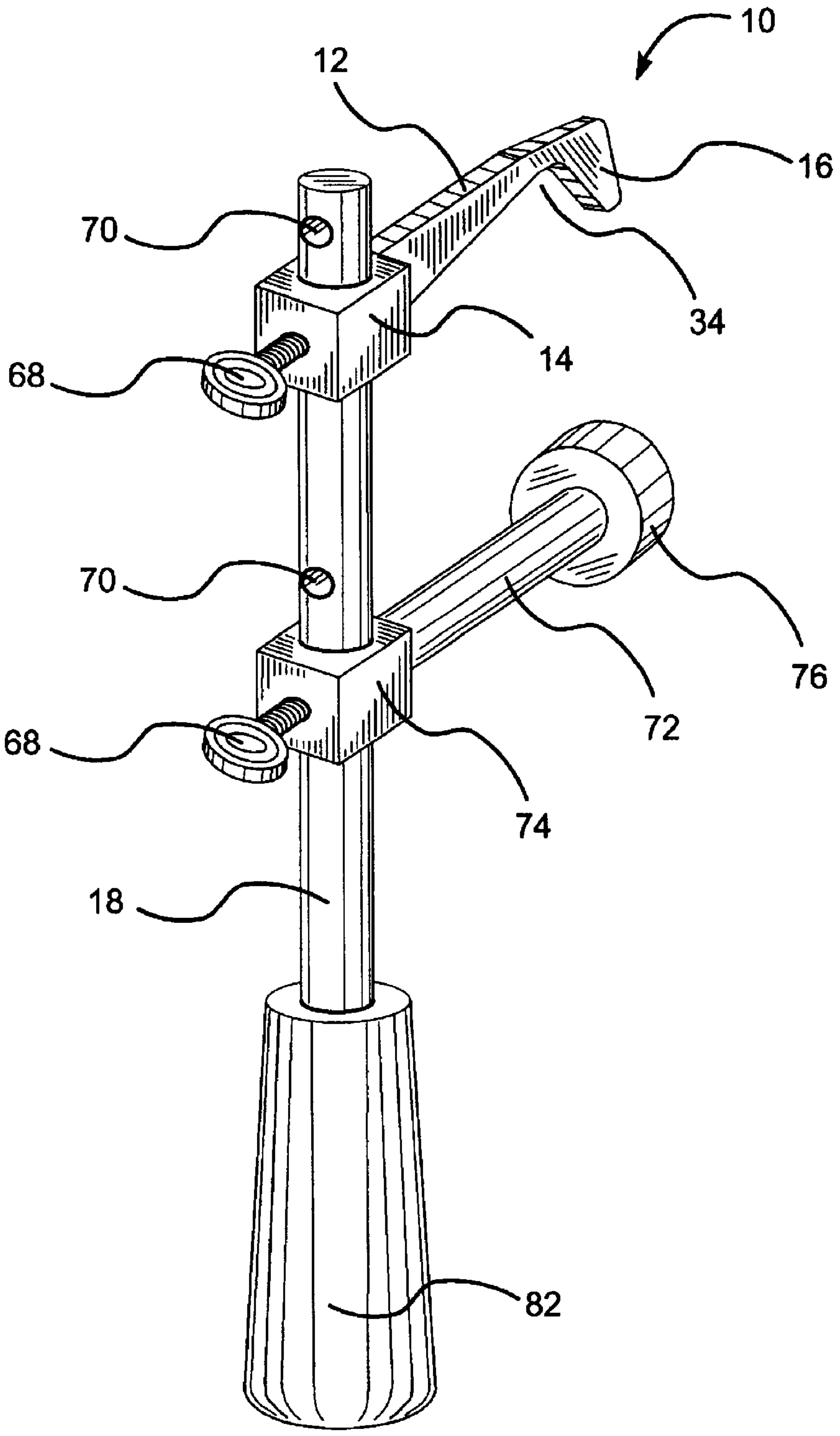
FIG. 8 is an isometric view of a seal puller tool head and a first embodiment of a fulcrum, both mounted transversely for variable positioning on a lever.

A hook 16 is formed at the distal tip of the blade 12. Cutting or grinding a notch in the blade can form the hook 16 at the free end of the blade. The hook 16 has a substantial transverse dimension to the longitudinal axis of the blade. Typically the hook may have either of two configurations. In FIGS. 1–3, 5–6, and 9, a first side profile of the hook 16 is approximately rectangular, such that a distal edge and a proximal edge of the hook are evenly spaced along their lengths. Further, these edges may be approximately perpendicular to the longitudinal dimension of the blade. This first profile provides a uniformly narrow hook or arm for entering behind a seal cage and having little tendency to slip. In FIGS. 4 and 8, a second side profile of the hook 16 is tapered, triangular, or wedge shaped. This second profile provides a relatively narrower tip on a relatively broader base joining the tip to the blade shank 12. The narrower or more pointed tip fits in tight clearances behind a seal, and the broad base resists bending or deformation during use.

Figure 5:
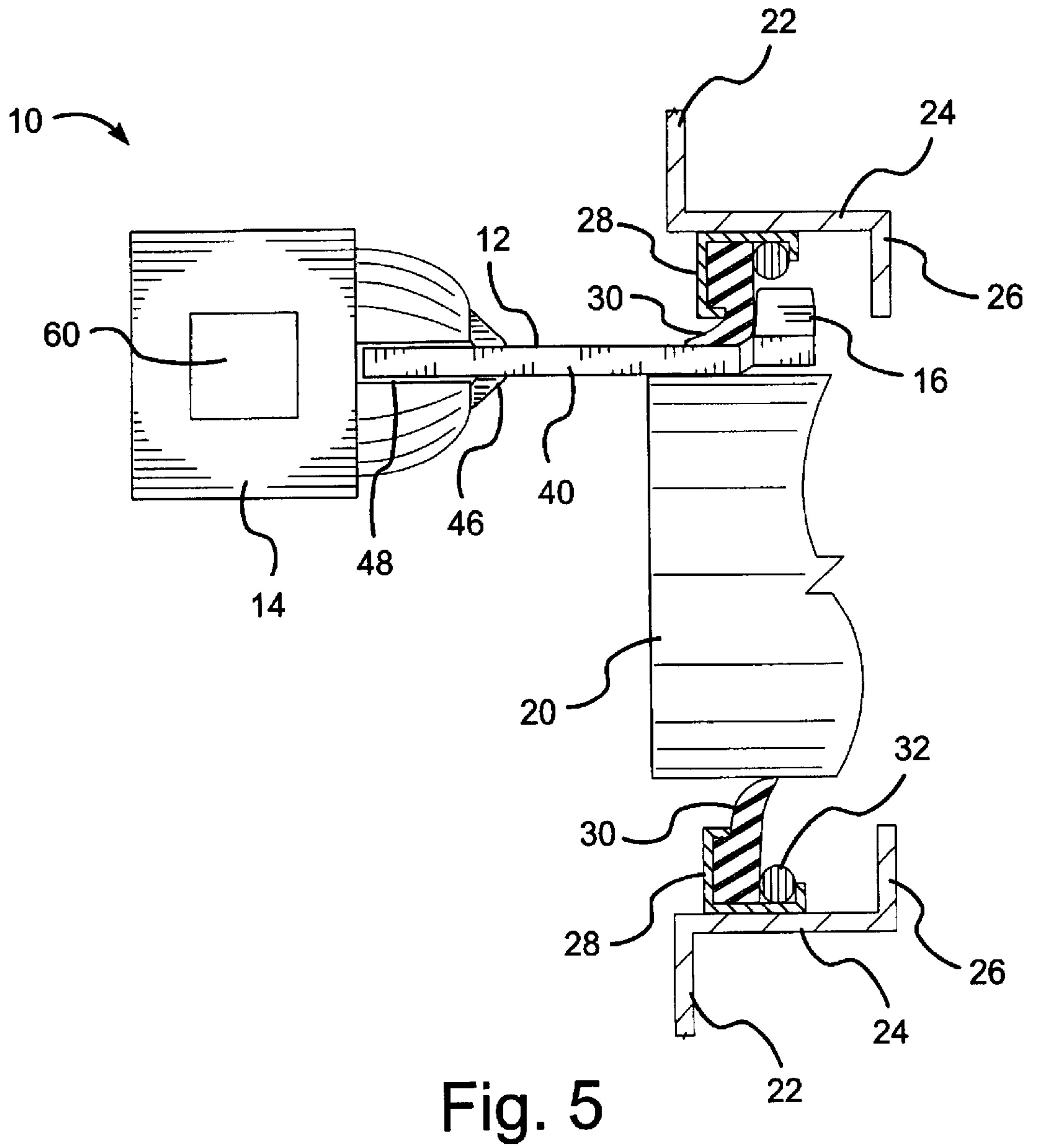
FIG. 5 is a rear view of a seal puller tool head in use with a typical sealed shaft, showing in vertical cross-section a seal in a seal recess.

FIG. 5 shows an example of how a shaft seal is carried with respect to a rotatable shaft. In a typical structure, a rotatable shaft 20 extends through an opening in an engine wall 22. The engine wall defines a seal recess around the shaft opening. A circumferential wall 24 defines the diameter of the recess. A stop wall 26 defines the depth of the recess. The shaft seal includes a metal cage 28 that provides a snug fit within the diameter of wall 24. The cage 28 carries the seal lip 30 that extends into sealing engagement against the circumferential surface of rotatable shaft 20. The shaft seal may include a retainer spring 32 carried in the cage behind the seal lip. The portion of the shaft seal shown at the lower half of FIG. 5 shows a shaft seal in a typical application, with lip 30 contacting a shaft in sealing contact. The portion of the shaft seal shown at the top half of FIG. 5 shows the seal engaged with a seal puller tool head 10.

Figure 6:
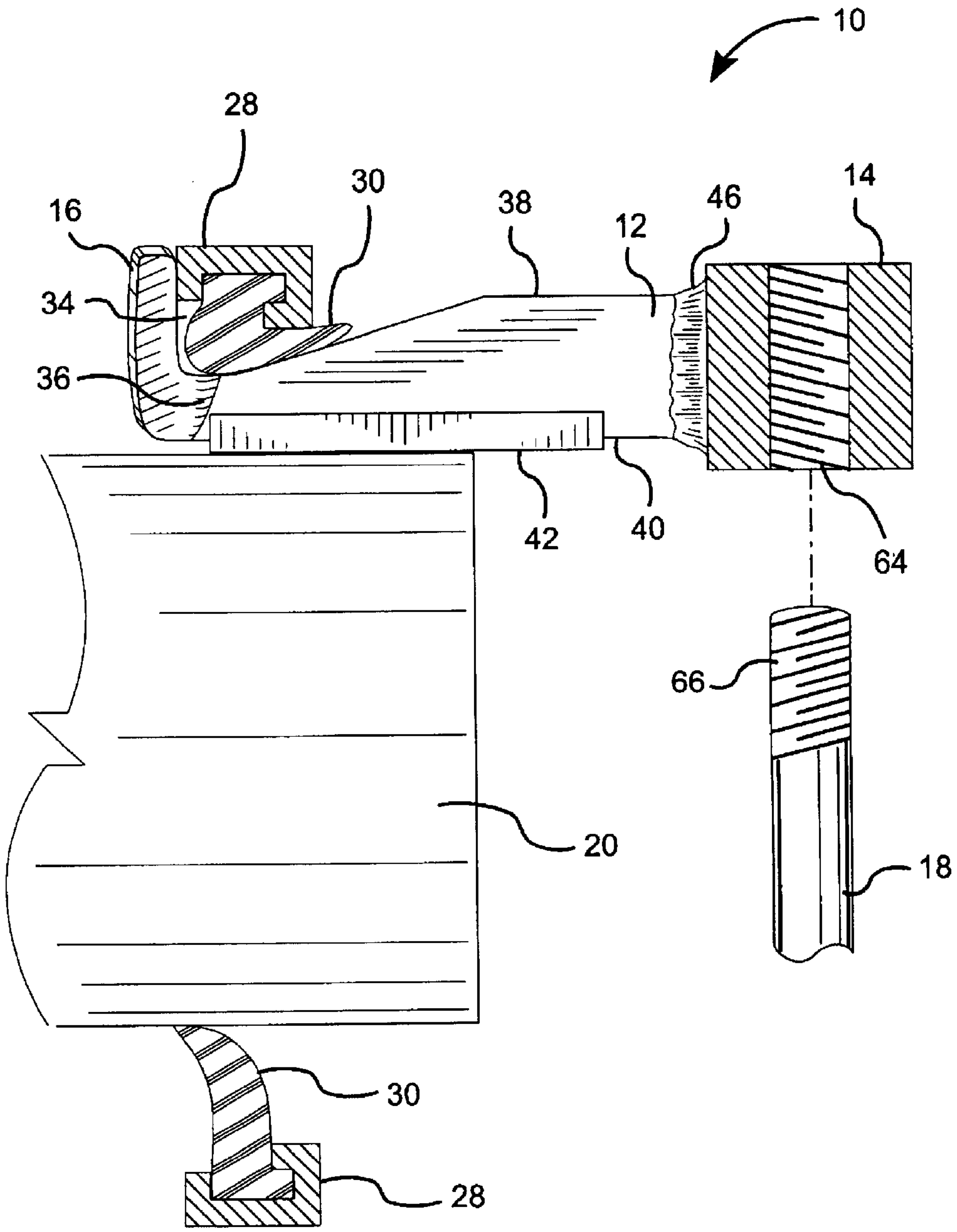
FIG. 6 is a side view of a seal puller tool head carrying an optional wear strip in contact with a shaft, showing in vertical cross-section a threaded base, showing in assembly view a transverse lever attachment with threaded end, and showing in vertical cross-section a seal.

Hook 16 is configured with respect to blade shank 12 to enter between a peripheral seal lip 30 and a central shaft 20, to rotate slightly, if required, to engage the backside of the seal cage 28, and to extract the seal, all without scratching the shaft. The hook defines a notch or recess 34 between its proximal edge and blade shank 12. The recess 34 is of sufficient size to receive the lip 30 of a seal to be removed, which allows the blade to be at least partially rotated to receive the lip of a seal in recess 34. The top portion of FIG. 5 illustrates the blade shank 12 in an entry position with the shank in a flat and symmetrical position on the shaft 20. The hook 16 is raised from the plane of shank 12 and engages the back of the seal and cage 28. FIG. 6 shows another seal lip 30 and illustrates how the seal lip 30 can be engaged in a recess 34 when the blade shank 12 is rotated by almost ninety degrees from entry position. The hook 16 in FIG. 6 almost fully engages the width of the seal cage 28. However, depending upon relative dimensions of the seal and hook, such a large degree of twisting may present a danger of scratching the recess wall 24 illustrated in FIG. 5.

The hook or arm 16 serves the essential purpose of hooking the inside surface of a seal 30 or seal cage 28 for pulling the seal out of a seal recess in a motor wall. The hook 16 is well suited for pulling a circular seal that is positioned around a sealed shaft 20, such as a camshaft or crankshaft. To achieve this function, the hook 16 is positioned distally, near the front or free end of the blade and extends laterally with respect to the longitudinal axis of the tool head 10. FIGS. 1 and 4 show that the tip of hook 16 is chamfered to eliminate sharp edges. The chamfer is desired to reduce the possibility that the tip of hook 16 might scratch the sidewall 24 of a seal recess as the seal is being pulled. At the same time, the tip of the hook 16 should not be overly curved, as it is desirable for the tip to engage a steel circumferential cage 28 that typically forms a circumferential outer portion of a seal. For the latter reason, the hook 16 requires a sufficiently sharp tip to hold engagement with the steel cage 28.

The hook 16 should have at least its tip bent, such as by a tilt, twist, or offset from the plane or other contour of blade shank 12. The bend should be sufficient that, when the blade has been inserted between a seal and shaft as shown at the top of FIG. 5, the tip of the hook 16 is raised off the surface of shaft 20 and disposed at least partially behind the seal lip 30 or cage 28. The bend or offset permits the hook 16 to engage the seal with minimal rotation of the blade beyond an entry position.

The blade shank 12 preferably lies in a single plane. The hook 16 is bent or offset out of the plane of the blade shank. Several types of bend or offset can be used, independently or in combination. The bending should be confined to a bend area juxtaposed to the hook 16 and blending smoothing into the shank 12 to avoid sharp edges that can scratch a shaft. When the blade is formed of sheet metal, bending is the preferred method of disposing the hook above the top face of the shank. References to bending include other methods of forming or reforming a metal object. For example, stamping, pressing, and coining methods all are known for shaping and reshaping metal, and these are included within the term, bending. If the blade if formed otherwise, such as by molding or machining from thicker stock, these methods can produce the same or an equivalent end structure and are included with the description of the resulting product, herein.

For example, FIG. 2 shows a twisted bend on the longitudinal axis of the tool head. With a twist, the blade lies in its own plane that intersects the plane of the shank approximately in parallel with the longitudinal axis of the shank. The hook 16 is bent to the right side of the blade shank in the view of FIG. 2 by a preselected acute angle. Suitable angles range from about ten degrees to about sixty degrees. The hook is bent to cause the tip of the hook 16 to lie substantially outside the plane or contour of the blade shank 12. Depending upon the chosen dimensions of the hook 16, the angle of the bend may be sufficient to displace the tip of hook 16 from the plane of the blade shank body. The bend can be to either side of the blade shank 12, such as to either the right or to the left in the view of FIG. 2. If the blade shank 12 is curved or configured other than flat, the bend of hook 16 should be sufficient to obtain a similar elevation of the hook tip behind the seal when the blade shank is in entry position against the shaft.

FIG. 5 shows another type of bend that will be termed an offset. With an offset, the hook lies in its own plane that is approximately parallel to the plane of the shank. The entire hook 16 has been displaced into a higher plane than blade shank 12, as viewed in FIG. 5. In addition, the hook 16 in FIG. 5 has been twisted to further elevate the tip, using a twist similar to the embodiment of FIG. 2.

FIG. 4 illustrates another type of bend that will be termed a tilt. With a tilt, the hook lies in its own plane that intersects the plane of the shank approximately perpendicular to the longitudinal axis of the shank. The tilt bend may be made in a bend area 36 lying approximately transverse to the longitudinal axis of the shank. A single transverse bend in area 36 produces a tilt in the orientation of hook 16 with respect to the plane of blade shank 12. A double bend, similar to that shown in FIG. 5, produces an offset. While a tilt does not uniformly elevate the tip of hook 16, it elevates at least a portion of the tip.

FIG. 3 shows a compound bend. The hook 16 is twisted on the longitudinal axis of the tool head according to the embodiment of FIG. 2. In addition, the hook is tilted on a transverse axis also lying in the plane of blade shank 12, such as through a bend area 36 as shown in the embodiment of FIG. 4. Thus, in the view of FIG. 3, the hook both tilts to the right from the plane of blade shank 12 and is twisted to the right on longitudinal axis in the plane of blade shank 12. Combinations of bends, including offsets, tilts, and twists can be employed to position the hook to engage a seal while the orientation of blade shank is not substantially twisted from the entry position of FIG. 5. Although a ninety-degree rotation as shown in FIG. 6 could be used, this is undesirable because it offers increased potential for the blade to scratch the shaft 20 or wall 24.

The blade is coated with a protective finish for preventing scratches if the blade contacts a crankshaft, camshaft, or other shaft 20 passing through a seal being removed. The finish coating is strong, flexible, and resilient. A preferred coating is rubber, urethane, or a cured plastic resin. Another suitable coating can be of a resilient mesh. The coating is bonded, adhered, or deposited on the blade to maintain its position even when the hook is flexed, bent, or pressed against metal surfaces.

A flat or planar blade shank 12 may lie on a shaft 20 in a symmetrical tangent position when used as shown in FIG. 5. In this position, the blade shank 12 presents little danger of scratching a sealed shaft 20 during insertion, use, or removal. The blade shank has two side edges that will be referred to as the hook-side edge 38 and the backside edge 40, both shown in FIGS. 4 and 6. If the tool head is used in a highly rotated position as shown in FIG. 6, the hook-side edge 38 is raised from the sealed shaft and is unlikely to cause a scratch. Examples of a hook-side edge 38 are shown as the right edge in FIG. 1, the bottom edge in FIG. 4, or the top edge in FIG. 6. These hook-side edges are unlikely to scratch the shaft in any mode of using the tool head 10.

Figure 7:
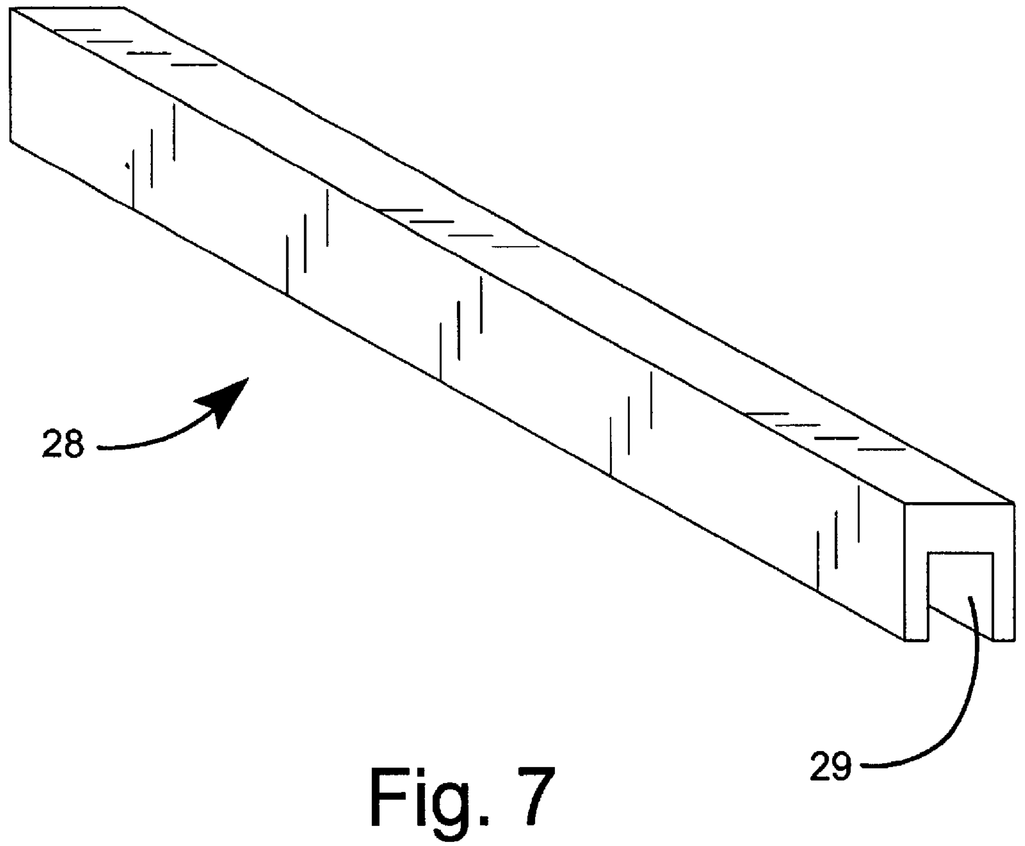
FIG. 7 is an isometric view of a wear strip for application to an edge of the blade.

However, the opposite or backside edge 40 may have considerable contact with a motor shaft and may be provided with supplemental protective coating. The coating at backside edge 40 should be especially durable or can be supplemented by an optional, durable wear strip 42 shown in FIGS. 1, 6, and 7. Such a wear strip may be bonded to the blade shank 12, molded into a coating on the blade, or applied over the coated surface of blade shank 12. A high friction coating such as rubber will help maintain a wear strip 42 in place if applied over the coating. Suitable materials for an external wear strip include plastics, such as ultra high molecular weight polyethylene, which can withstand high pressures without cracking. The wear strip can define a groove 44 as best shown in FIG. 7 for engaging the backside edge 40 of the blade shank 12.

The base 14 in FIGS. 1–3 is permanently fixed to the blade shank 12, such as by welding the blade shank 12 to the base 14. The drawings illustrate a welded connection at intermediate weldment area 46. Any such welded connection is near the proximal end of the blade, which does not contact a shaft 20. Other and supplemental attachment methods can be used. For example, the base 14 may engage the blade shank 12 in a preselected position such as a diametric or transverse slot 48, best shown in FIG. 5. The blade shank 12 can be further attached to the base by a weldment 46 adjacent to slot 48. FIGS. 2 and 5 also show that the base 14 may be domed at the attachment to the blade. A domed base provides improved clearance for using the blade in tight spaces.

A suitable base 14 allows a supplemental tool to be fastened to the tool head 10 for applying a pulling force or leverage. For this purpose, the base 14 provides a means for engaging with such a supplemental tool. For example, the base may define a threaded aperture 50 that is longitudinally aligned with the body of the blade shank 12. In the embodiment shown in FIG. 1, the threaded aperture 50 and a slide hammer shaft 52 are sized for mutual engagement. The slide hammer shaft 52 can be screwed into the base by a threaded tip 54. The shaft carries a sliding hammer weight 56 that is moveable on the shaft to strike an end stop 58 at a proximal end of the shaft 52 opposite from slide hammer tip 54.

In typical use, the hook 16 is slid in a flat or co-planar position through the interface between the seal lip 30 and motor shaft 20. The bent hook 16 first passes beyond the seal lip 30 with shank 12 positioned to orient hook 16 in a generally flat or tangent relationship to the surface of the shaft 20. The bent hook 16 is positioned to be elevated from the shaft when the blade shank 12 enters the seal/shaft interface. Thus, the hook is bent away from shaft 20 and toward the seal lip 30, so that the hook 16 engages behind the lip when the blade is sufficiently inserted. When the hook 16 has traveled beyond the lip, the pressure of the seal lip 30 on blade shank 12 tends to automatically adjust the position of the blade shank 12 into a generally flat and symmetrical relationship to the shaft. This adjustment moves the hook 16 behind the seal lip 30 and toward the seal cage 28 for best engagement. Optionally, the hook 16 can be twisted further to improve the engagement between the hook and the cage. In this event, the protective coating or wear strip 42 on the blade shank 12 serves as a protective barrier between the backside edge of blade shank 12 and shaft 20.

The base 14 provides a grip surface for twisting the blade and permits the use of a standard wrench when the base 14 has been formed of a square or hexagonal nut. The threaded end 54 of the slide hammer shaft 52 can be screwed into the base 14 when desired to permit the slide hammer to apply a removal force to the seal.

FIG. 4 shows a modified embodiment of the tool head 10 for use in tight clearances. The blade is coated with a protective finish. Base 14 contains a transverse passage 60 that is generally parallel to the plane of the blade. The passage 60 is suited to receive an elongated lever 18 for applying a prying force. One suitable engagement with lever 18 is by a straight socket of limited engagement, such that the lever bottoms in the socket or is limited in its degree of entry. For example, the lever 18 is shown to have a square end 62 for engaging the socket 60. FIG. 5 shows that the socket 60 in base 14 may define a square socket for receiving the square end 62. The socket 60 may be sized to receive a three-eighths or one-half inch square end 62, enabling the use of socket wrench extension bars in such standard sizes to be used as the lever 18. Accordingly, the socket 60 may be configured with a recess on each internal wall for receiving a ball-detent of a socket extension bar for retaining the bar. In addition, the base 14 shown in FIGS. 4 and 5 has a square exterior shape, which enables the base to be gripped in a wrench for twisting the blade, as previously described.

FIG. 6 shows a base 14 with a modified passage 64 configured as a transverse threaded bore. A mating lever 18 has a threaded distal end 66 for engaging transverse threaded bore 64. A single base 14 may be equipped with both transverse and longitudinal bores in different respective faces of the base. This enables a single tool head to be used either with transverse or longitudinal levers. Further, any lever 18 may be sized to receive a slide hammer 56 so that the single lever can be used both in any position with respect to the tool head and for any method of applying extraction force through the tool head 10. Clearly a lever that engages a tool head by threaded socket connection is suited for such multiple usages, while a lever with a straight socket connection would be poorly suited for use with a slide hammer.

Significantly, the transverse blade can be positioned on a lever 18 in either of two relative orientations, shown in the embodiments of FIGS. 4 and 6. The transverse passages 60, 64 are open at both ends, which can be conveniently referred to as the hook-side end and backside end of the passages. The passages 60, 64 can be engaged from either end. Thus, in the arrangement shown in FIG. 4, a lever 18 engages the hook-side end of passage 60, with the result that hook 16 opens toward the lever 18. Alternatively, in the arrangement shown in FIG. 6, the lever 18 engages the backside end of the passage 64, with the result that hook 16 extends away from the lever 18. The lever 18 can engage either the hook-side or backside end of the passages 60, 64 to position the hook 16 extending toward the front or rear of the assembled tool.

The operation of the tools in FIGS. 4 and 6 is similar. The hook 16 is engaged with a rear or inside face of a seal as previously described. Base 14 can be turned or rotated, such as by using a wrench, to further engage the hook 16 with the seal. However, lever 18 also can apply twisting or rotational force. Thus, lever 18 is inserted into a bore or socket of base 14. The lever 18 can be of any desired length and can be pivoted against any nearby fulcrum surface, such as a scrap of wood interposed between the lever 18 and the engine to serve as a fulcrum.

The seal puller tool 10 is effective to pull seals where the surface of shaft 20 is in direct contact with the lip 30 of the seal, and the seal is pressed into a surrounding engine wall. The thin, sheet metal blade with protective coating can easily engage and pull the seal from the surrounding engine wall without damaging the surface of the shaft 20. The tool is capable of operating in tight quarters. The length of the tool head 10 can be quite short, requiring only a blade shank 12 of preselected length and a base 14 for engagement. The tool head can be produced in any required length or shortness to accommodate shaft seals in various sunken recesses or surface sites. Thus, for purposes of example and not limitation, a short blade might have a length as small as, for example, one inch, while a long blade can have a length of several inches.

A base 14 can be equally variable in preselected size. FIGS. 1 and 2 show that a suitable base 14 can be formed of a hexagonal nut. FIGS. 4–6 show that a suitable base 14 can be formed of a square nut. Suitable levers 18 may have a diameter or transverse dimension of, for example, from one-quarter inch to one-half inch. Levers, slide hammers, and other similar rods and handles can engage the base 14 from substantially any direction, including longitudinal engagement and transverse engagement. A transverse engagement can be from any transverse direction such as the hook side edge of the blade, the backside edge of the blade, or any other desired approach.

The offset of bent hook 16 with respect to blade shank 12 allows the hook 16 to engage a seal without twisting the blade a full ninety degrees, as might be required with certain other seal pullers. The offset or bend of the hook 16 can be toward either face of the blade.

A comparison of FIG. 1 with FIGS. 4 and 6 shows that a transverse passage 60, 64 in base 14 places lever 18 in a perpendicular position to slide hammer shaft 52 of FIG. 1. This positioning of the transverse passages 60, 64 enables the tool 10 to be used in tight spaces, such as between the end of a transverse-mounted engine and a side wall of an engine compartment.

FIG. 8 shows a preferred embodiment of the seal puller tool operated on a transverse lever 18 with a handle 82 at one end. The tool head 10 in this embodiment is mounted on a base 14 having a transverse straight through bore for receiving the lever 18 to any desired degree. The lever and straight bore allow a wide range of adjustment in the position of the tool head 10 on the lever. If desired, the lever and tool head can be clamped in a fixed relative position by a pressure-clamping device. For example, the base 14 carries a thumbscrew 68 that can be tightened to apply the end of the thumbscrew against the lever. This type of pressure claim will secure the base in a fixed position on the lever 18. In some situations, the thumbscrew may be unnecessary, as it may be suitable for the tool head to be free sliding on the lever.

The lever and tool head also can be secured in a fixed and predetermined position by a positive locking system such as a locking pin in a socket. For example, the lever 18 may define a plurality of sockets or diametric bores 70 at preselected positions and sized to receive the thumbscrew. Alternatively, the base 14 can be provided with a spring-loaded ball detent facing into the transverse bore. Such a ball detent can be manually slid along the lever to any desired location, with or without a matching socket. The ball detent provides frictional resistance tending to retain base 14 in a fixed position on lever 18. If located over a socket 70, the ball detent will engage the socket with a stronger securing force that still can be overcome by additional manual sliding. Thus, a plurality of bores or sockets 70 may be located at spaced intervals along the length of lever 18 to provide varying degrees of secure mounting for the tool head 10.

The embodiment of FIG. 8 may include a fulcrum 72 carried on a base 74 that may employ the same of different securing devices as described for use with tool head base 14. Thus, a friction clamp such as a ball detent or a thumbscrew fastener 68 can engage a lever 18. The fulcrum carries a disc-shaped pad as a head 76. The pad has a broad diameter for spreading force over a substantial area, to avoid damage to a motor wall. The length and configuration of the fulcrum 72 may be selected for different requirements and preferences. For example, the length of the fulcrum can be longer or shorter than the length of the tool head. The pad 76 also is subject to variation in size and shape. Both the tool head 10 and the fulcrum 72 can be variably positioned on the lever 18, including placement in any relative order or with any spacing.

Figure 9:
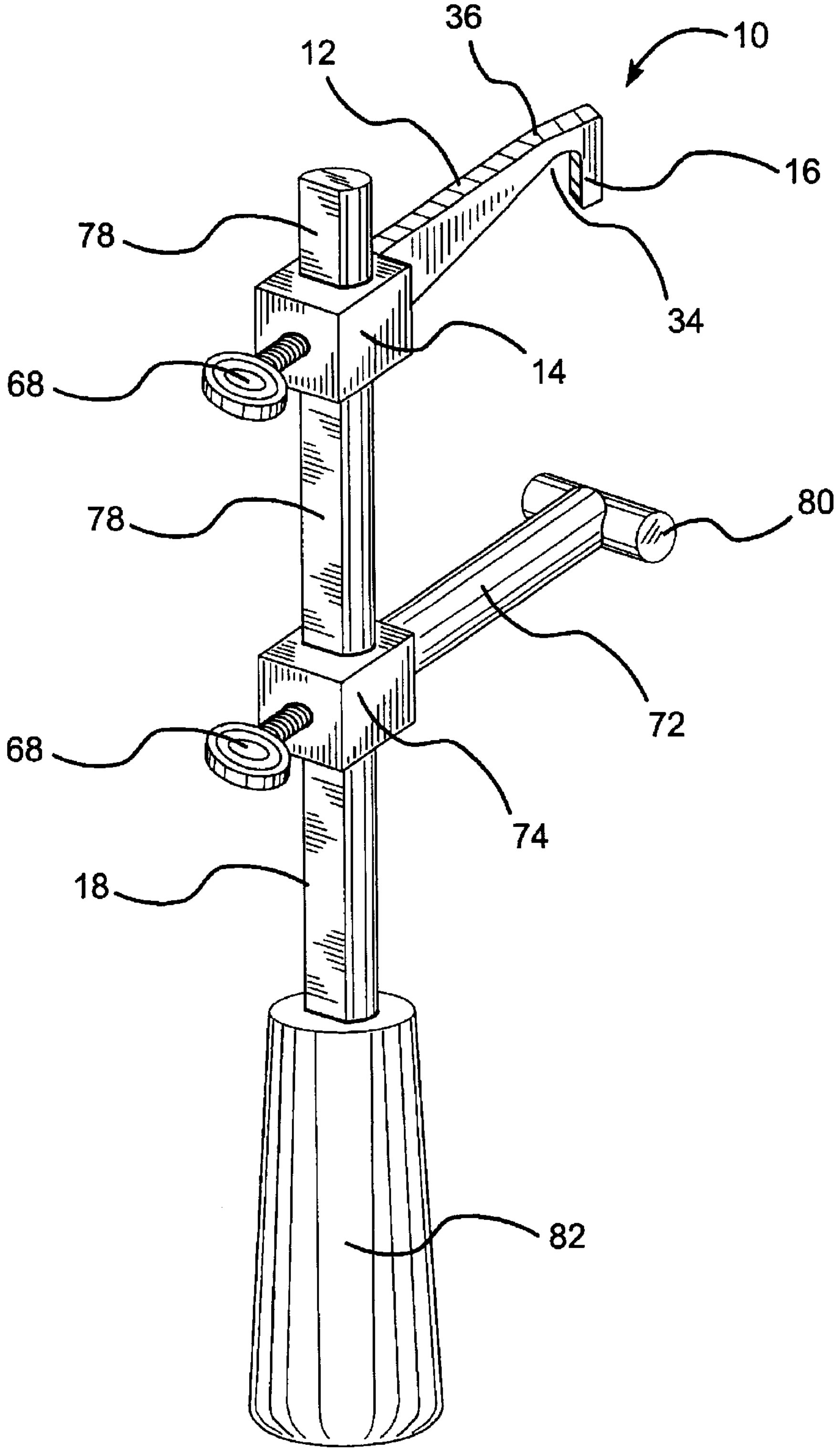
FIG. 9 is an isometric view similar to FIG. 8, showing a modified lever with a flat side and a modified fulcrum.

FIG. 9 shows another preferred embodiment of the seal puller tool. This embodiment provides a lever 18 with a handle 82 on one end. The lever provides at least one longitudinal flat side 78. The flat side provides a stable reception surface for thumbscrews 68. Because the flat side is continuous over the length of the lever 18, it provides infinitely variable positioning of the tool head and fulcrum. The base blocks 14 and 74 may have a flat-sided bore corresponding the cross-section of the lever and its flat side. The matching profile of the bore provides a means for holding the tool head 10 or fulcrum in a fixed rotational position on lever 18. The fulcrum carries a pivot head 80, configured as an elongated cylindrical rod arranged to pivot on one side. The rod dissipates load along its length.

The forgoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

What is claimed is:

1. A seal puller tool adapted for entering an interface between a shaft seal and a sealed shaft to pull the seal, comprising:

a generally planar shank having opposite proximal and distal ends, a bottom major face and a top major face, and opposite side edges including a hook-facing side edge and a backside edge;

a seal-engaging hook located on the distal end of said shank, opening toward said hook-facing side edge, disposed with a free end at least partially offset out of a plane of said top major face of the shank above said top face of the shank, such that, in use, said free end is positionable behind the shaft seal while the shank is disposed with said bottom face against the shaft; and an attachment base connected to the proximal end of the shank.

2. The seal puller tool of claim 1, wherein:

said hook and said shank are portions of a unitary blade having distal and proximal ends and opposite side edges; and the hook is defined by a notch in one of said side edges and near the distal end of the blade.

3. The seal puller tool of claim 2, wherein:

said blade is formed of generally planar sheet stock; and said hook is elevated above the top face of the shank by a bend in the sheet stock.

4. The seal puller of claim 3, wherein:

said bend is located between the shank and the hook; and the bend is chosen from the group consisting of a twist, a tilt, an offset, or any combination of these.

5. The seal puller of claim 1, further comprising:

a scratch-protective coating on said shank for protecting against scratching of a sealed shaft during use of the tool.

6. The seal puller of claim 5, wherein:

said scratch-protective coating is formed of a material chosen from the group consisting of rubber, urethane, cured plastic resin, resilient mesh, or any combination thereof.

7. The seal puller of claim 1, further comprising:

a wear strip at least partially covering said backside edge for protecting against scratching of a sealed shaft during use of the tool.

8. The seal puller of claim 1, further comprising:

an elongated lever connected to said attachment base for manipulating said hook.

9. The seal puller of claim 8, wherein:

said shank is longitudinally elongated between said proximal and distal ends;

said lever is connected to the attachment in longitudinal alignment with the shank; and the lever further comprises a slide hammer.

10. The seal puller of claim 8, wherein:

said shank is longitudinally elongated between said proximal and distal ends;

said lever is connected to the attachment base in an orientation relative to the shank chosen from the group consisting of longitudinal; transverse and coplanar with the shank, extending from the hook-facing side edge; or transverse and coplanar with the shank, extending from the backside edge.

11. The seal puller tool of claim 8, wherein:

said elongated lever is joined to said attachment base by a connection device chosen from the group consisting of a threaded socket, a straight socket of limited engagement, a straight socket with through bore, a pressure clamp, a positive lock, or any combination thereof.

12. The seal puller tool of claim 8, further comprising:

a fulcrum; and a fulcrum base carrying said fulcrum;

wherein said elongated lever carries the fulcrum base in a position suitable for applying a prying force via said hook.

13. The seal puller tool of claim 12, wherein:

said elongated lever is joined to said fulcrum base by a connection device chosen from the group consisting of a straight socket with through bore, a pressure clamp, a positive lock, or any combination thereof.

14. A seal puller tool adapted for entering an interface between a shaft seal and a sealed shaft to pull the seal, comprising:

a longitudinally elongated planar blade having first and second major faces, having a notch formed in an edge thereof, defining a seal-engaging arm located at a first longitudinal end of the blade and disposed transversely to the longitudinal dimension of the blade;

an attachment base connected to the second longitudinal end of said blade and defining at least one connection means for receiving a lever; and a lever engageable with said connection means for manipulating said seal-engaging arm;

wherein said seal-engaging arm includes a free transverse end disposed out of a plane of said first major face above said first major face of said blade such that in use the blade is inserted between a shaft and a surrounding shaft seal with said second major face toward the shaft and said free transverse end above the first major face and engageable with the seal.

15. The seal puller tool of claim 14, wherein:

said seal-engaging arm is disposed via a bend area to one side of the plane of said blade by an acute angle.

16. The seal puller tool of claim 14, wherein:

said seal-engaging arm is disposed via a bend area to one side of the plane of said blade by an acute angle in the range from ten degrees to sixty degrees.

17. The seal puller tool of claim 14, wherein:

said seal-engaging arm is disposed to one side of the plane of said blade by a bend in said blade located in a bend area juxtaposed to the seal-engaging arm; and the bend is chosen from the group consisting of a twist, a tilt, an offset, and any combination of these.

18. The seal puller tool of claim 14, wherein:

said seal engaging arm includes a free end disposed near a lateral edge of said blade; and said free end of the arm is chamfered.

19. The seat puller tool of claim 14, wherein:

said seal engaging arm is of approximately uniform width in its transverse disposition to the blade.

20. The seal puller tool of claim 14, wherein:

said seal engaging arm is tapered from a narrower free end to a broader base in its transverse disposition to the blade.

* * * * *